(12) United States Patent
Lin

(10) Patent No.: US 8,254,132 B2
(45) Date of Patent: Aug. 28, 2012

(54) FLASH DRIVE AND HOUSING ASSEMBLY THEREOF

(75) Inventor: Wei-Hung Lin, Hsinchu County (TW)

(73) Assignee: Phison Electronics Corp., Miaoli (TW)

( * ) Notice: Subject to any disclaimer, the term of this patent is extended or adjusted under 35 U.S.C. 154(b) by 341 days.

(21) Appl. No.: 12/605,869

(22) Filed: Oct. 26, 2009

(65) Prior Publication Data

US 2010/0110643 A1 May 6, 2010

(30) Foreign Application Priority Data

Nov. 5, 2008 (TW) .............................. 97142744 A

(51) Int. Cl.
*H05K 7/00* (2006.01)
*H05K 5/00* (2006.01)
(52) U.S. Cl. ....................................... 361/728
(58) Field of Classification Search ................. 361/728, 361/730, 737, 752, 755, 679.33, 679.02, 361/679.31, 679.39, 727; 439/138, 142
See application file for complete search history.

(56) References Cited

U.S. PATENT DOCUMENTS

| | | | | |
|---|---|---|---|---|
| 6,456,500 B1 * | 9/2002 | Chen | ............................. | 361/752 |
| 6,932,629 B2 * | 8/2005 | Ikenoue | ........................ | 439/138 |
| 6,963,468 B2 * | 11/2005 | Chang et al. | ................ | 360/97.01 |
| 7,778,037 B2 * | 8/2010 | Huang | ........................... | 361/752 |
| 2005/0161513 A1 * | 7/2005 | Huang et al. | ................... | 235/492 |
| 2006/0002069 A1 * | 1/2006 | Chuang | ......................... | 361/683 |
| 2007/0252010 A1 * | 11/2007 | Gonzalez et al. | ............. | 235/492 |
| 2008/0019090 A1 * | 1/2008 | Zhu et al. | ...................... | 361/684 |
| 2008/0087731 A1 * | 4/2008 | Gonzalez et al. | ............. | 235/441 |

FOREIGN PATENT DOCUMENTS

| | | |
|---|---|---|
| TW | I262373 | 9/2006 |
| TW | 200842550 | 11/2008 |
| WO | WO 2007137483 A1 * | 12/2007 |

OTHER PUBLICATIONS

Chinese Examination Report of Taiwan Application No. 10020383060, dated May 9, 2011.

\* cited by examiner

*Primary Examiner* — Timothy Thompson
*Assistant Examiner* — Sherman Ng
(74) *Attorney, Agent, or Firm* — J.C. Patents

(57) ABSTRACT

A flash drive and a housing assembly thereof is provided. The housing assembly comprises a housing, a base and a rotating mechanism. The housing has a first opening, a second opening, and a space, the first opening is situated at a side surface of the housing, and the second opening is situated on a top surface of the housing. The base is used for accommodating a storage device which has a connecting member, the base is movably disposed in the space and has a slot facing the second opening. The rotating mechanism is disposed at the second opening and mounted to the housing, the rotating mechanism has a protrusion portion movably engaged in the slot. When the rotating mechanism rotates relative to the housing, the protrusion portion moves along the slot and drives the base to reciprocate between a first position and a second position.

24 Claims, 4 Drawing Sheets

FLASH DRIVE AND HOUSING ASSEMBLY THEREOF

CROSS-REFERENCE TO RELATED APPLICATION

This application claims the priority benefit of Taiwan application serial no. 97142744, filed on Nov. 5, 2008. The entirety of the above-mentioned patent application is hereby incorporated by reference herein and made a part of this specification.

BACKGROUND OF THE INVENTION

1. Field of the Invention

The present invention relates to a flash drive. More particularly, the present invention relates to a flash drive provided with a rotating mechanism which drives storage device sliding relative to a housing of the flash drive.

2. Description of Related Art

With the developments of multimedia technology, storage capacity required for digital data goes larger and larger. Conventional floppy disk in 1.44 MB features in its portable characteristic but still fails to meet the requirement of large storage capacity. Although a conventional hard disk provides a large storage capacity, it still suffers in bulk size which leads to inconvenient carrying. Recently, with the popularization of the universal serial bus (USB) interface and the reduction of the price of the flash memory, USB flash drives advantaged in large storage capacity, high compatibility and portability are broadly applied in data transmission between various computers and storage devices.

The flash drive featuring in large storage capacity, plug-and-play, compact size and portability has taken the place of the floppy disk. Since the flash drive is electrically connected to the computer host and the storage device via a connecting member such as a USB plug or an IEEE 1394 plug, an issue of preventing the connecting member from being damaged as colliding with an external object highly concerns the manufacturer of the flash drive.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY OF THE INVENTION

The present invention is directed to a flash drive, wherein a rotating mechanism is adopted to drive the storage device sliding relative to the housing, so as to preserve a connecting member of the storage device.

The present invention is directed to a housing assembly, wherein a rotating mechanism is adopted to drive a base slides relative to the housing, so as to preserve an object disposed on the base.

As embodied and broadly described herein, a flash drive comprising a housing, a base, a storage device having a connecting member and a rotating mechanism is provided. The housing has a first opening, a second opening, and a space, wherein the first opening is situated at a side surface of the housing, and the second opening is situated on a top surface of the housing. The base is used for accommodating a storage device, wherein the base is movably disposed in the space and has a slot facing the second opening. The rotating mechanism is disposed at the second opening and pivotably mounted to the housing, wherein the rotating mechanism has a protrusion portion movably engaged in the slot. When the rotating mechanism rotates relative to the housing, the protrusion portion moves along the slot and drives the base to reciprocate between a first position and a second position, and when the base moves from the first position to the second position, the connecting member goes through the first opening and is exposed out of the housing.

A housing assembly comprising a housing, a base and a rotating mechanism is further provided. The housing has a first opening, a second opening, and a space, wherein the first opening is situated at a side surface of the housing, and the second opening is situated on a top surface of the housing. The base is used for receiving an object having a connecting member, wherein the base is movably disposed in the space and has a slot facing the second opening. The rotating mechanism is disposed at the second opening and pivotably mounted to the housing, wherein the rotating mechanism has a protrusion portion movably engaged in the slot. When the rotating mechanism rotates relative to the housing, the protrusion portion moves along the slot and drives the base to reciprocate between a first position and a second position, and when the base moves from the first position to the second position, the connecting member goes through the first opening and is exposed out of the housing.

In an embodiment of the present invention, the rotating mechanism rotates relative to the housing clockwise or counterclockwise.

In an embodiment of the present invention, the rotating mechanism comprises a rotating disk and a rotating lid, the rotating lid couples with the rotating disk to mount the rotating mechanism to the housing, and the protrusion portion is located on a surface of the rotating disk away from the rotating lid.

In an embodiment of the present invention, a movement path of the protrusion portion is a circle, and a diameter of the circle is 12 millimeters (mm).

In an embodiment of the present invention, the housing further has at least a stopper in the space to locate the base in the first position.

In an embodiment of the present invention, the housing comprises a first housing body and a second housing body connected with each other to form the space.

In an embodiment of the present invention, the first housing body has at least a locking button, the second housing body has at least a locking hook, and the second housing body is fixed to the first housing body by engaging the locking hook with the locking button.

In an embodiment of the present invention, the connector is an adapter plug, a USB plug or an IEEE 1394 plug. In an embodiment of the present invention, the object is an electronic device.

In an embodiment of the present invention, the storage device is a flash memory storage device.

In an embodiment of the present invention, the housing further comprises a locating bump and the rotating mechanism further comprises an indentation for being engaged with the locating bump.

The flash drive and the housing assembly of the present invention is provided with the rotating mechanism and a base sliding relative to the housing, and therefore when using the flash drive an user can rotate the rotating mechanism to drive the base and expose the connecting member out of the housing to be connected with other electronic devices. Furthermore, when the flash drive is not in used, the user may rotate the rotating mechanism again to drive the base and retract the connecting member into the housing. Accordingly, the flash drive is capable of preserving the connecting member from being damaged as colliding with an external object.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention.

DESCRIPTION OF EMBODIMENTS

Figure 1:
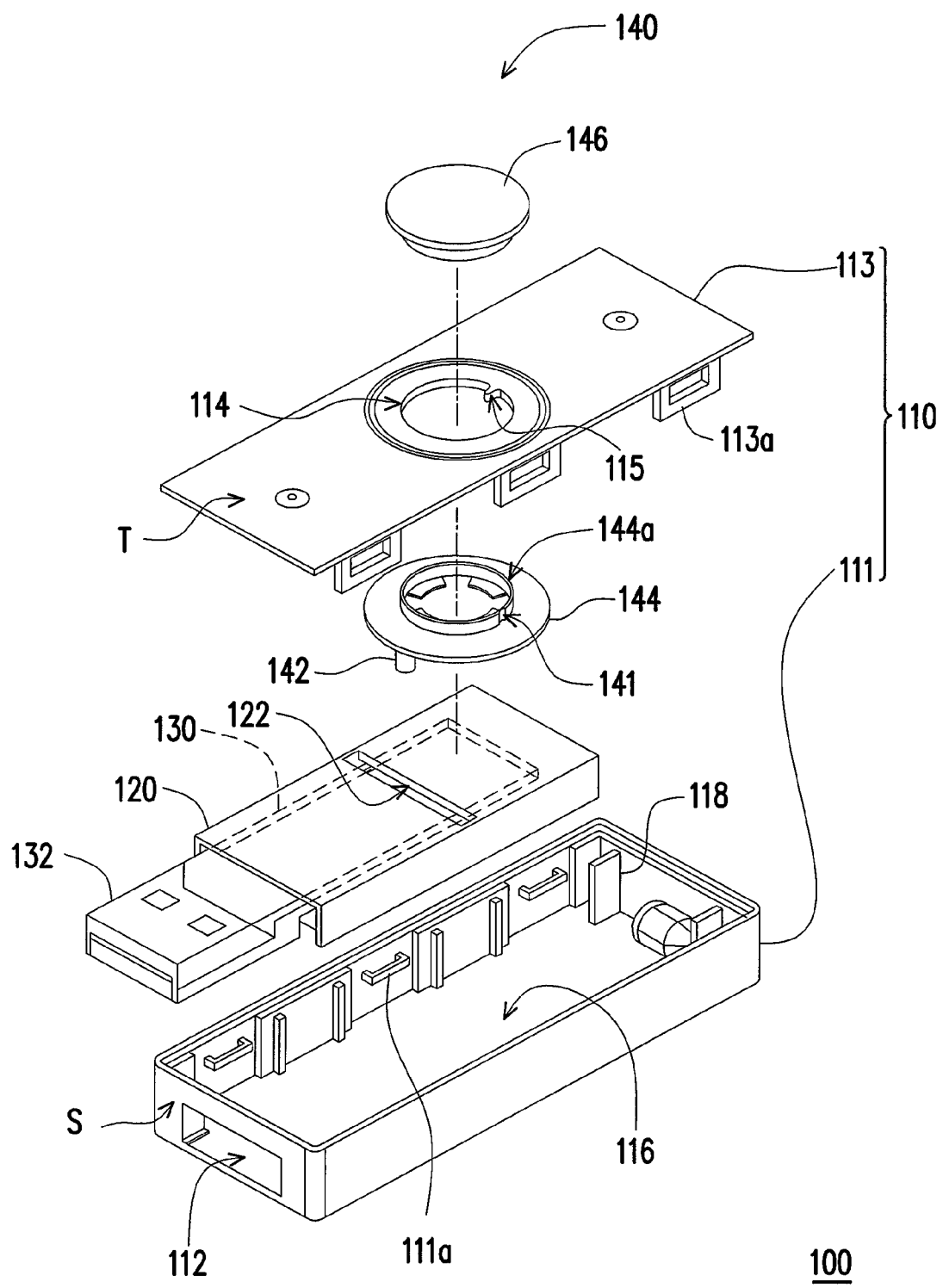
FIG. 1 is an exploded view of a flash drive and a housing assembly thereof according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

A flash drive and a housing assembly thereof are provided, wherein the housing assembly comprises a housing, a base and a rotating mechanism. The base is driven by the rotating mechanism to reciprocate in the housing, and the base can accommodate an object having a connecting member. Specifically, the object can be a storage device to provide a flash drive. Detailed explanations are given below.

FIG. 1 is an exploded view of a flash drive and a housing assembly thereof according to an embodiment of the present invention. Referring to FIG. 1, the flash drive 100 comprises a housing 110, a base 120, a storage device 130 and a rotating mechanism 140.

The housing 110 has a first opening 112, a second opening 114, and a space 116, wherein the first opening 112 is situated at a side surface S of the housing 110, and the second opening 114 is situated on a top surface T of the housing 110.

In an embodiment of the present invention, the housing 110 comprises a first housing body 111 and a second housing body 113 connected with each other to form the space 116. Particularly, in this embodiment, the first housing body 111 has a plurality of locking buttons 111a, the second housing body 113 has a plurality of locking hooks 113a, and the second housing body 113 is fixed to the first housing body 111 by engaging the locking hooks 113a with the locking buttons 111a.

It should be noted that the housing 110 of the present embodiment is composed of the first housing body 111 and the second housing body 113 being engaged with each other via the locking buttons 111a and the locking hooks 113a. However, the present invention provides no limit thereto. Any type of housing capable of accommodating the base and compatible with the aforementioned operating manner can further be applied in the present invention. In addition, the quantity of locking buttons 111a and the locking hooks 113a are not limited and may vary with the requirement of design of the housing.

The base 120 is movably disposed in the space 116 and provided with a slot 122 facing the second opening 114, wherein the profile of the base 120 substantially complies with the space 116 to allow the base 120 moving in the space 116. In this embodiment, the base 120 leans against the inner bottom surface of the first housing body 111 and moves in the space 116 with the restriction of two side walls of the first housing body 111.

However, in another embodiment of the present invention, the base 120 may be provided with a rail (not shown), and the first housing body 111 may be provided with a protrusion (not shown) corresponding to the rail, so that the base 120 can move in the space 116 via the couple of the protrusion and the rail. Therefore, the moving mechanism provided between the base 120 and the space 116 is not limited in the present invention. Any mechanism capable of allowing the base 120 moving within the space 116 should be considered as being in the scope of the present invention.

On the other hand, the base 120 is used for accommodating the storage device 130 which can be a flash memory storage device as illustrated in this embodiment. However, the present invention provides no limit to the type of the storage device 130. In another embodiment of the present invention, the storage device 130 can further be a read only memory (ROM) storage device or other applicable storage devices.

Furthermore, the connecting member 132 provides the function of electrically connecting the object in the base 120 with other electronic devices. In this embodiment, the connecting member 132 is provided with gold fingers (not shown) for electrically connecting the storage device 130 with other electronic devices to transmit data. In an embodiment of the present invention, the connecting member 132 can be but not limit to a universal serial bus (USB) plug. In another embodiment, the connecting member 132 may further be an IEEE 1394 plug or other applicable plugs. In further another embodiment not shown, the connecting member 132 can be an adapter plug connected with other electronic devices.

The rotating mechanism 140 is disposed at the second opening 114 and pivotably mounted to the housing 110. More specifically, in an embodiment of the present invention, the rotating mechanism 140 comprises a rotating disk 144 and a rotating lid 146, wherein the rotating disk 144 extends a coupling portion 144a passing through the second opening 114 and coupled with the rotating lid 146 to mount the rotating mechanism 140 to the housing 110. It should be noted that the present invention provides no limit to the connecting manner between the rotating mechanism 140 and the housing 110. Any applicable manner capable of driving the base 120 by the rotating mechanism 140 should be considered as being in the scope of the present invention.

In addition, in the present embodiment, the rotating mechanism 140 has a protrusion portion 142 movably engaged in the slot 122. Specifically, the protrusion portion 142 is located on a surface of the rotating disk 144 away from the rotating lid 146. In other words, the protrusion portion 142 is in the backside of the rotating lid 146 and faces the slot 122.

When the rotating mechanism 140 is rotated, the protrusion portion 142 moves along a circular path of the rotating mechanism 140 and drives the base 120 moving in the space 116 by the engagement with the slot 122. In an embodiment of the present invention, a diameter of the circular path of the protrusion portion 142 is 12 millimeters (mm) which complies with the standard minimum length (i.e. 11.75 mm) of the regulation of USB connecting member. Thus, a connecting member complying with the USB regulation can be retracted in or exposed out of the housing 110 by turning the rotating mechanism 140. The operation of shifting the base 120 by turning the rotating mechanism 140 accompanying with figures is illustrated below.

It is noted that, in the present embodiment, the slot 122 is situated on a top surface of the base 120 and facing the second opening 114, such that the protrusion portion 142 can be engaged in the slot 122. However, the present invention provides no limit to the position of the slot 122 on the base 120. Mechanisms capable of complying with the rotating mechanism 140 and the protrusion portion 142 thereof to drive the base 120 are preferred in the present invention.

Figure 2:
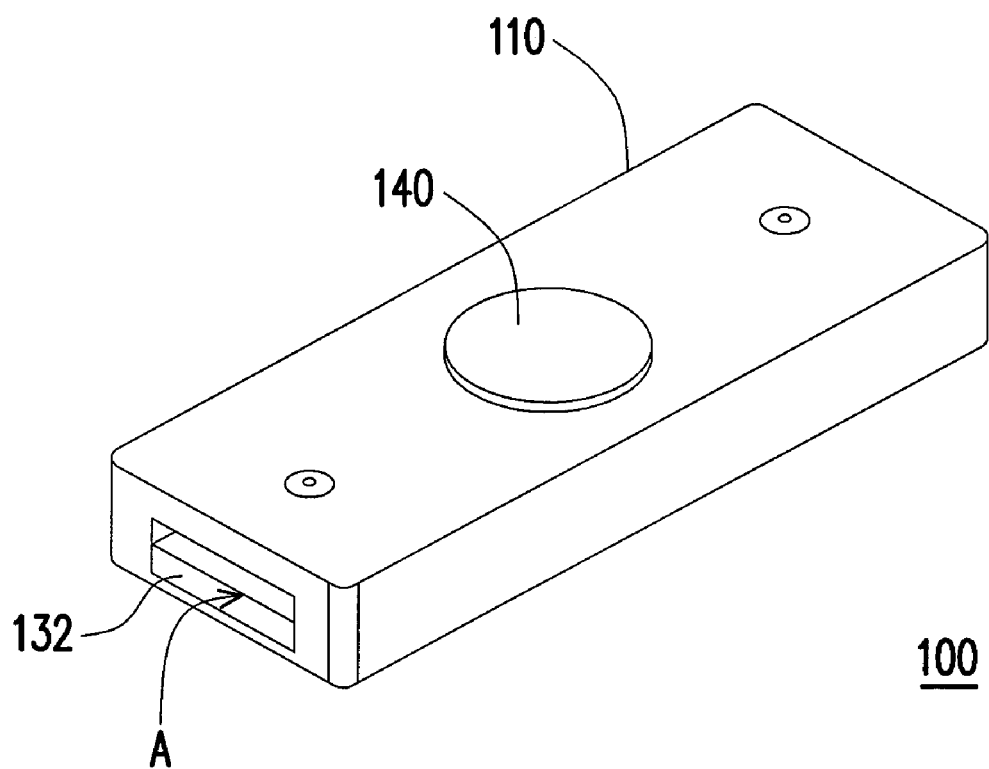
FIG. 2 is a schematic view illustrating the flash drive and the housing assembly of FIG. 1 provided with a connecting member retracted in a housing.
Figure 3:
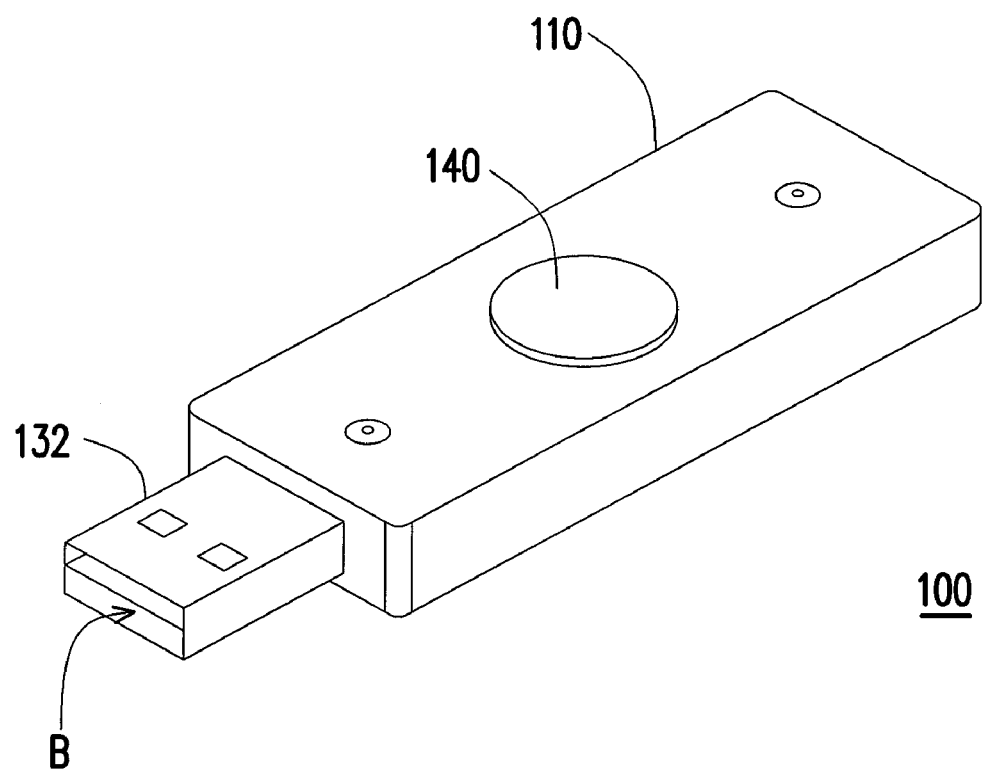
FIG. 3 is a schematic view illustrating the flash drive and the housing assembly of FIG. 1 provided with a connecting member exposed out of a housing.

FIG. 2 is a schematic view illustrating the flash drive and the housing assembly of FIG. 1 provided with a connecting member retracted in a housing. FIG. 3 is a schematic view illustrating the flash drive and the housing assembly of FIG. 1 provided with a connecting member exposed out of a housing. Referring to FIG. 1, FIG. 2 and FIG. 3, when the rotating mechanism 140 is rotated relative to the housing 110, the protrusion portion 142 moves in the slot 122, so as to transfer the rotation of the rotating mechanism 140 into a linear motion of the base 120 by the interference between the protrusion portion 142 and the slot 122. Therefore, the rotating mechanism 140 drives the base 120 to reciprocate between a first position A and a second position B, and when the base 120 moves from the first position A to the second position B, the connecting member 132 goes through the first opening 112 and is exposed out of the housing 110 for the flash drive 100 to be connected with other electronic devices. Furthermore, the rotating mechanism 140 can drives the base 120 from the second position B back to the first position A, by which the connecting member 132 is retracted and preserved in the housing 110.

In one embodiment of the invention, the housing 110 may further comprise a stopper 118. The stopper 118 is located in the space 116 for locating the base 120 in the first position A. However, the profile, quantity and arrangement of the stopper 118 are not limited in the present invention and depend on the profile of the base 120. Moreover, in another embodiment of the present invention, the housing 110 further comprises a locating bump 115 on the top surface T around the second opening 114, and the rotating mechanism 140 further comprises an indentation 141 corresponding to the locating bump 115, such that the locating bump 115 can be engaged with the indentation 141 to locate the base 120 on the second position B, by which a tangible operation feel can be provided as driving the rotating mechanism 140. Furthermore, the present invention provides no limit to the quantity and the arrangement of the locating bump 115 and the corresponding indentation 141 of the flash drive 100. In another embodiment of the present invention, two locating bumps are disposed around the second opening, wherein the two locating bumps are located at two opposite sides of the second opening and on the same diameter. When the base is located on the first position A or the second position B, corresponding indentations are respectively engaged with the two locating bumps. Therefore, a tangible operation feel can be provided as operating the flash drive.

Accordingly, the protrusion portion 142 of the rotating mechanism 140 and the slot 122 of the base 120 performs a relative motion and interferes with each other, such that the base 120 can be driven to reciprocate in the housing 110 by the rotation of the rotating mechanism 140. By which, the connecting member 132 can be exposed out of or retracted in the housing 110 according to the requirement in using. Hence, the flash drive 100 and the housing assembly according to the aforementioned embodiments meet the requirement of preserving the connecting member 132.

Furthermore, the rotating mechanism 140 can be turned clockwise or counterclockwise to drive the base 120 performing a linear reciprocation in the housing 110 without being limited by the direction or times of rotation.

Figure 4:
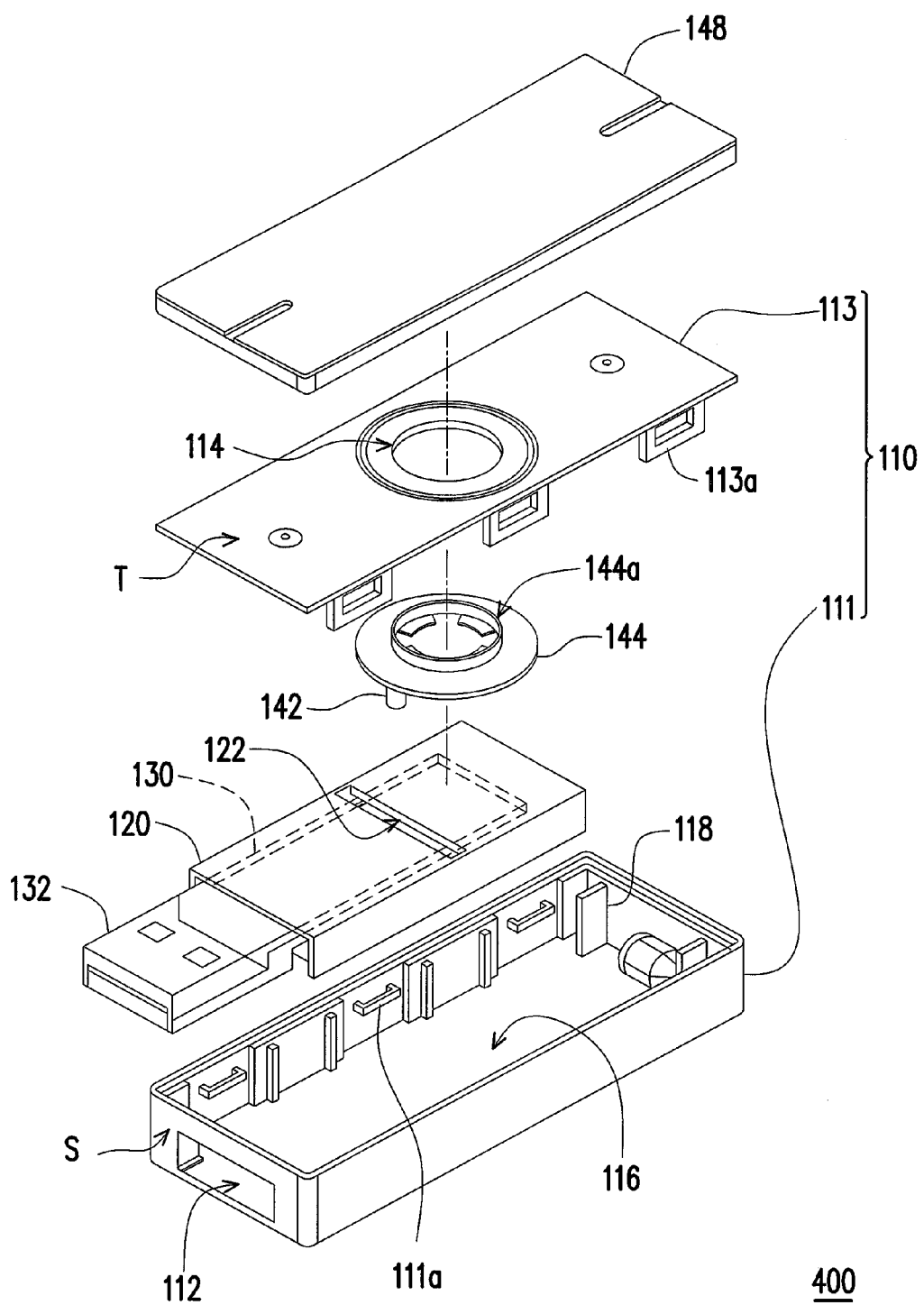
FIG. 4 is an exploded view of a flash drive and a housing assembly thereof according to another embodiment of the present invention.

FIG. 4 is an exploded view of a flash drive and a housing assembly thereof according to another embodiment of the present invention. Referring to FIG. 4, the difference between the flash drive 400 of the present embodiment and the flash drive 100 of the above embodiment is that the rotating lid 148 is shaped into a rectangular sheet. Other components of the flash drive 400 are similar to those of the aforementioned embodiments, and therefore descriptions of these components are omitted. In addition, it should be noted that the profile of the rotating lid 148 can be various according to different design concepts, and the present invention provides no limit thereto.

In summary, the flash drive and the housing assembly of the present invention is provided with a rotating mechanism and a base driven by the rotating mechanism to slide relative to the housing, and therefore when the flash drive is not in used, the connecting member can be preserved in the housing from being damaged as colliding with an external object. When using the flash drive, the user may rotate the rotating mechanism to drive the base and expose the connecting member out of the housing to connect other electronic device.

Furthermore, the protrusion portion of the rotating mechanism is engaged and interfered with the slot of the base, such that the rotation of the rotating mechanism can be transferred to the linear motion of the base. Whether the rotating mechanism rotates clockwise or counterclockwise, without being limited by the time of rotation of the rotating mechanism, the base can perform a linear reciprocation in the housing.

The previously described exemplary embodiments of the present invention have many advantages, including preserving the connecting member from being damaged as colliding with an external object, wherein the advantages aforementioned are not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A flash drive, comprising:
    a housing, having a first opening, a second opening, and a space, wherein the first opening is situated at a side surface of the housing, and the second opening is situated on a top surface of the housing;
    a base, only movably disposed in the space and having a slot facing the second opening, wherein an orthogonal projection of the slot on the top surface is in long-strip shape and perpendicular to the moving direction of the base;
    a storage device, having a connecting member and being disposed in the base; and
    a rotating mechanism, disposed at the second opening and pivotably mounted to the housing, wherein the rotating mechanism has a protrusion portion movably engaged in the slot,
    wherein when the rotating mechanism rotates relative to the housing, the protrusion portion moves along the slot in a circular loop and drives the base to move in a linear loop, such that the base reciprocates between a first position and a second position, and
    when the base moves from the first position to the second position, only the connecting member goes through the first opening and is exposed out of the housing, and a moving distance of the slot between the first position and the second position is equal to a diameter of the circular loop.

2. The flash drive as claimed in claim 1, wherein the rotating mechanism rotates relative to the housing clockwise or counterclockwise.

3. The flash drive as claimed in claim 1, wherein the rotating mechanism comprises a rotating disk and a rotating lid, the rotating lid couples with the rotating disk to mount the rotating mechanism to the housing, and the protrusion portion is located on a surface of the rotating disk away from the rotating lid.

4. The flash drive as claimed in claim 1, wherein a movement path of the protrusion portion is a circle, and a diameter of the circle is 12 millimeters.

5. The flash drive as claimed in claim 1, wherein the housing further has at least a stopper in the space to locate the base in the first position.

6. The flash drive as claimed in claim 1, wherein the housing comprises a first housing body and a second housing body connected with each other to form the space.

7. The flash drive as claimed in claim 6, wherein the first housing body has at least a locking button, the second housing body has at least a locking hook, and the second housing body is fixed to the first housing body by engaging the locking hook with the locking button.

8. The flash drive as claimed in claim 1, wherein the connecting member is a USB plug or an IEEE 1394 plug.

9. The flash drive as claimed in claim 1, wherein the storage device is a flash memory storage device.

10. The flash drive as claimed in claim 1, wherein the housing further comprises a locating bump and the rotating mechanism further comprises an indentation for being engaged with the locating bump.

11. A housing assembly, comprising:
    a housing, having a first opening, a second opening, and a space, wherein the first opening is situated at a side surface of the housing, and the second opening is situated on a top surface of the housing;
    a base, for accommodating an object having a connecting member, wherein the base is only movably disposed in the space and has a slot facing the second opening, an orthogonal projection of the slot on the top surface is in long-strip shape and perpendicular to the moving direction of the base; and
    a rotating mechanism, disposed at the second opening and pivotably mounted to the housing, wherein the rotating mechanism has a protrusion portion movably engaged in the slot,
    wherein when the rotating mechanism rotates relative to the housing, the protrusion portion moves along the slot in a circular loop and drives the base to move in a linear loop, such that the base reciprocates between a first position and a second position, and
    when the base moves from the first position to the second position, only the connecting member goes through the first opening and is exposed out of the housing, and a moving distance of the slot between the first position and the second position is equal to a diameter of the circular loop.

12. The housing assembly as claimed in claim 11, wherein the rotating mechanism rotates relative to the housing clockwise or counterclockwise.

13. The housing assembly as claimed in claim 11, wherein the rotating mechanism comprises a rotating disk and a rotating lid, the rotating lid couples with the rotating disk to mount the rotating mechanism to the housing, and the protrusion portion is located on a surface of the rotating disk away from the rotating lid.

14. The housing assembly as claimed in claim 11, wherein a movement path of the protrusion portion is a circle, and a diameter of the circle is 12 millimeters.

15. The housing assembly as claimed in claim 11, wherein the housing further has at least a stopper in the space to locate the base in the first position.

16. The housing assembly as claimed in claim 11, wherein the housing comprises a first housing body and a second housing body connected with each other to form the space.

17. The housing assembly as claimed in claim 16, wherein the first housing body has at least a locking button, the second housing body has at least a locking hook, and the second housing body is fixed to the first housing body by engaging the locking hook with the locking button.

18. The housing assembly as claimed in claim 11, wherein the connecting member is an adapter plug.

19. The housing assembly as claimed in claim 11, wherein the object is an electronic device.

20. The housing assembly as claimed in claim 11, wherein the housing further comprises a locating bump and the rotating mechanism further comprises an indentation for being engaged with the locating bump.

21. A housing assembly, comprising:
    a housing, having a first opening, a second opening, and a space, wherein the first opening is situated at a side surface of the housing, and the second opening is situated on a top surface of the housing;
    a first object, only movably disposed in the space and has a first connection element, wherein an orthogonal projection of the first connection element on the top surface is in long-strip shape and perpendicular to the moving direction of the first object; and
    a rotating mechanism, disposed at the second opening and pivotably mounted to the housing, wherein the rotating mechanism has a second connection element movably engaged with the first connection element,
    wherein when the rotating mechanism rotates in a circular loop relative to the housing, the second connection element drives the first object to move in a linear loop, such that the first object reciprocates between a first position and a second position, and a moving distance of the first connection element between the first position and the second position is equal to a diameter of the circular loop.

22. The housing assembly as claimed in claim 21, wherein the first object further comprises a connecting member, and when the first object moves from the first position to the second position, the connecting member goes through the first opening and is exposed out of the housing.

23. The housing assembly as claimed in claim 21, wherein a movement path of the second connection element is a circle, and a diameter of the circle is 12 millimeters.

24. The housing assembly as claimed in claim 21, wherein the first object is an electronic device.

* * * * *